US012165825B2

(12) United States Patent
Vasilev et al.

(10) Patent No.: US 12,165,825 B2
(45) Date of Patent: Dec. 10, 2024

(54) SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

(71) Applicant: Hitachi Energy Ltd, Zürich (CH)

(72) Inventors: Borislav Vasilev, Sofia (BG); Georgi Manev, Sofia (BG); Veselin Nikolov, Sofia (BG); Angel Mihaylov, Plovdiv (BG)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/242,575

(22) Filed: Sep. 6, 2023

(65) Prior Publication Data

US 2023/0411089 A1 Dec. 21, 2023

Related U.S. Application Data

(63) Continuation of application No. 18/037,685, filed as application No. PCT/EP2022/051586 on Jan. 25, 2022.

(30) Foreign Application Priority Data

Feb. 16, 2021 (EP) .................................... 21157411

(51) Int. Cl.
*H01H 9/00* (2006.01)
*H01H 3/44* (2006.01)

(52) U.S. Cl.
CPC ............ *H01H 9/0027* (2013.01); *H01H 3/44* (2013.01)

(58) Field of Classification Search
CPC .......... H01H 9/0027; H01H 3/44; H01H 9/00; H01H 3/40; H01H 19/00; H01H 21/00; H01H 3/30; H01H 13/72

(Continued)

(56) References Cited

U.S. PATENT DOCUMENTS

2013/0213776 A1 8/2013 Hoepfl et al.
2019/0096596 A1 3/2019 Hammer et al.

FOREIGN PATENT DOCUMENTS

CN 103534776 A 1/2014
EP 3758034 A1 12/2020

(Continued)

OTHER PUBLICATIONS

Chinese Office Action and English Summary, Chinese Application No. 2022800069620, mailed Sep. 9, 2023, 5 pages.

(Continued)

*Primary Examiner* — Renee S Luebke
*Assistant Examiner* — Iman Malakooti
(74) *Attorney, Agent, or Firm* — Sage Patent Group

(57) ABSTRACT

Switching system for an on-load tap changer, on-load tap changer and method for switching a tap connection of an on-load tap changer A switching system for an on-load tap changer comprises:
- a rotatable ring stack, wherein the rotatable ring stack is part of an internal Geneva mechanism,
- a drive system, wherein the ring stack comprises:
- a first current carrier ring and a second current carrier ring each of which is selectively electrically coupleable to one of a plurality of contact elements of the tap changer, and
- a Geneva ring, wherein the drive system comprises a driving wheel, wherein
- the Geneva ring is mechanically coupleable with the driving wheel, such that the Geneva ring is rotatable by the driving wheel,
- the first and the second current carrier rings each are coupled with the Geneva ring such that a rotation of (Continued)

Geneva ring causes a joint rotation of the first and the second current carrier ring.

19 Claims, 3 Drawing Sheets

(58) Field of Classification Search
USPC .............................. 200/11 TC, 238; 336/137
See application file for complete search history.

(56) References Cited

FOREIGN PATENT DOCUMENTS

| | | | |
|---|---|---|---|
| EP | 3758035 | A1 | 12/2020 |
| JP | H07312316 | A | 11/1995 |
| JP | 2000340434 | A | 12/2000 |
| JP | 2013201319 | A | 10/2013 |
| KR | 20140096052 | A | 5/2013 |
| WO | 2018148811 | A1 | 8/2018 |

OTHER PUBLICATIONS

Chinese Search Report, Chinese Application No. 2022800069620, mailed Sep. 28, 2023, 3 pages.
International Search Report and Written Opinion of the International Searching Authority, PCT/EP2022/051586, mailed May 24, 2022, 14 pages.
Extended European Search Report, European Application No. 21157411.6, mailed Jul. 19, 2021, 12 pages.

SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

CROSS REFERENCE TO RELATED APPLICATIONS

This application is continuation of Ser. No. 18/037,685 filed on May 18, 2023, which is a 35 U.S.C. § 371 national stage application of PCT International Application No. PCT/EP2022/051586 filed on Jan. 25, 2022, which in turn claims priority to European Patent Application No. 21157411.6, filed on Feb. 16, 2021, the disclosures and content of which are incorporated by reference herein in their entireties.

TECHNICAL FIELD

The present disclosure relates to a switching system for an on-load tap changer, e.g., a switching system for switching a tap connection of the on-load tap changer. The present disclosure further relates to an on-load tap changer comprising such a switching system and a method for switching a tap connection in particular by using a switching system disclosed herein.

BACKGROUND

On-load tap changers, for example, are built into power transformers and regulate their voltage under-load, i.e., without interrupting the power supply to consumers.

JP 2013 201319 A relates to a tap changer that has a drive shaft located at the center of an insulating cylinder. At an upper portion of the drive shaft, a Geneva gear mechanism that rotationally drives the drive shaft is connected.

SUMMARY

It is desirable to provide a switching system for an on-load tap changer that is reliable and allows an easy switching as well as a corresponding on-load tap changer and a corresponding method for switching a tap connection of an on-load tap changer.

According to an embodiment, a switching system for a tap selector of an on-load tap changer comprises:

a rotatable ring stack, a drive system, wherein the ring stack comprises:

a first current carrier ring and a second current carrier ring each of which is selectively electrically coupleable to one of a plurality of contact elements of the on-load tap changer, and a Geneva ring, wherein the drive system comprises a driving wheel, wherein the Geneva ring is mechanically coupleable with the driving wheel, such that the Geneva ring is rotatable by the driving wheel, the first and the second current carrier rings each are coupled with the Geneva ring such that a rotation of Geneva ring causes a joint rotation of the first and the second current carrier ring.

The switching system allows the joint rotation of the first current carrier ring together with the second current carrier ring. Multiple mechanisms for a separated movement of the current carrier rings can be avoided. Complex interconnected mechanisms that rotate the first current carrier ring independent from the second current carrier ring can be avoided. In particular, the rotatable ring stack as a whole is rotated by the driving wheel such that the first and the second current carrier ring move simultaneously together.

For example, the first current carrier ring corresponds to odd positions of the on-load tap changer. The second current carrier ring, for example, corresponds to even positions of the on-load tap changer. The switching system provides a compact and simple driving of both current carrier rings and thus of both the odd and even positions. This is realized by stacking the first and the second current carrier ring such that they rotate uniformly together simultaneously. There is one single Geneva driving mechanism which comprises the driving wheel and the Geneva ring for rotating the first current carrier ring as well as the second current carrier ring.

The switching system with the Geneva driving mechanism allows an intermittent motion of both current carrier rings driven by a single Geneva ring. The switching system allows a compact size and a reduced complexity. The switching system is robust and reliable.

According to embodiments, the switching system comprises a drive shaft. The drive shaft is rotatable to rotate the driving wheel. The drive shaft is arranged eccentrically to the Geneva ring. In particular, the drive shaft comprises only one single driving wheel. The drive shaft is rotatable to rotate the single driving wheel. The drive shaft is rotatable to rotate the first and the second current carrier ring via the single driving wheel.

According to further embodiments, the rings of the rotatable ring stack are fixed to each other. In particular, the Geneva ring, the first current carrier ring and the second current carrier ring are fixed to each other such that a rotational movement of the rings relative to each other is blocked. If one of the rings of the rotatable ring stack is rotated relative to the drive shaft, the other of the rings of the rotatable ring stack also rotates simultaneously.

The rings of the rotatable ring stack are coupled to each other such that rotational forces are transferable between the rings.

According to further embodiments, an electrically conductive coupling between the current carrier rings and the contact elements is established via movable contacts. The movable contacts are fixed to the current carrier rings and immovable with respect to the respective current carrier ring. The movable contacts are movable relative to the contact elements. By electrically conductive coupling between one of the movable contacts and one of the contact elements a tap position of the on-load tap changer is selected. The electrically conductive coupling is established along a radial direction of the ring stack. A radial outer side of the movable contacts comes into electrically conductive contact with a side of the contact element chasing the ring stack.

According to a further embodiment, the contact elements each comprise an elongated arc-shaped form. The contact elements, for example, partially surround the first or the second current carrier rings. The elongated arc-shaped form allows contact with the movable contacts such that a current supply interruption during a tap change is avoided. The arc-shaped form allows a mechanical and electrical contact with the contact even during rotation of the movable contact.

According to an embodiment, a tap selector of an on-load tap changer comprises a switching system according to at least one embodiment described herein. The on-load tap changer comprises the contact elements. The ring stack of the switching system is rotatable relative to the contact elements. For example, the contact elements are fixed to a housing of the on-load tap changer. The rotatable ring stack is rotatable relative to the housing. The switching system is arranged inside the housing.

According to an embodiment, a method for switching a tap connection of an on-load tap changer comprises:

rotating a driving wheel, coupling the driving wheel to a Geneva ring of a ring stack, and thereby rotating the Geneva ring, and thereby rotating a first current carrier ring and a second current carrier ring of the ring stack jointly.

Thus, reliable switching operations between all odd and even positions are possible.

For example, the method for switching the tap connection is performed with the aid of a switching system described herein. Features and advantages described in connection with the switching system also apply to the on-load tap changer and the method and the other way around.

BRIEF DESCRIPTION OF THE DRAWINGS

The accompanying figures are included to provide a further understanding. In the figures, elements of the same structure and/or functionality may be referenced by the same reference signs. It is to be understood that the embodiments shown in the figures are illustrative representations and are not necessarily drawn to scale.

DETAILED DESCRIPTION

Figure 1:
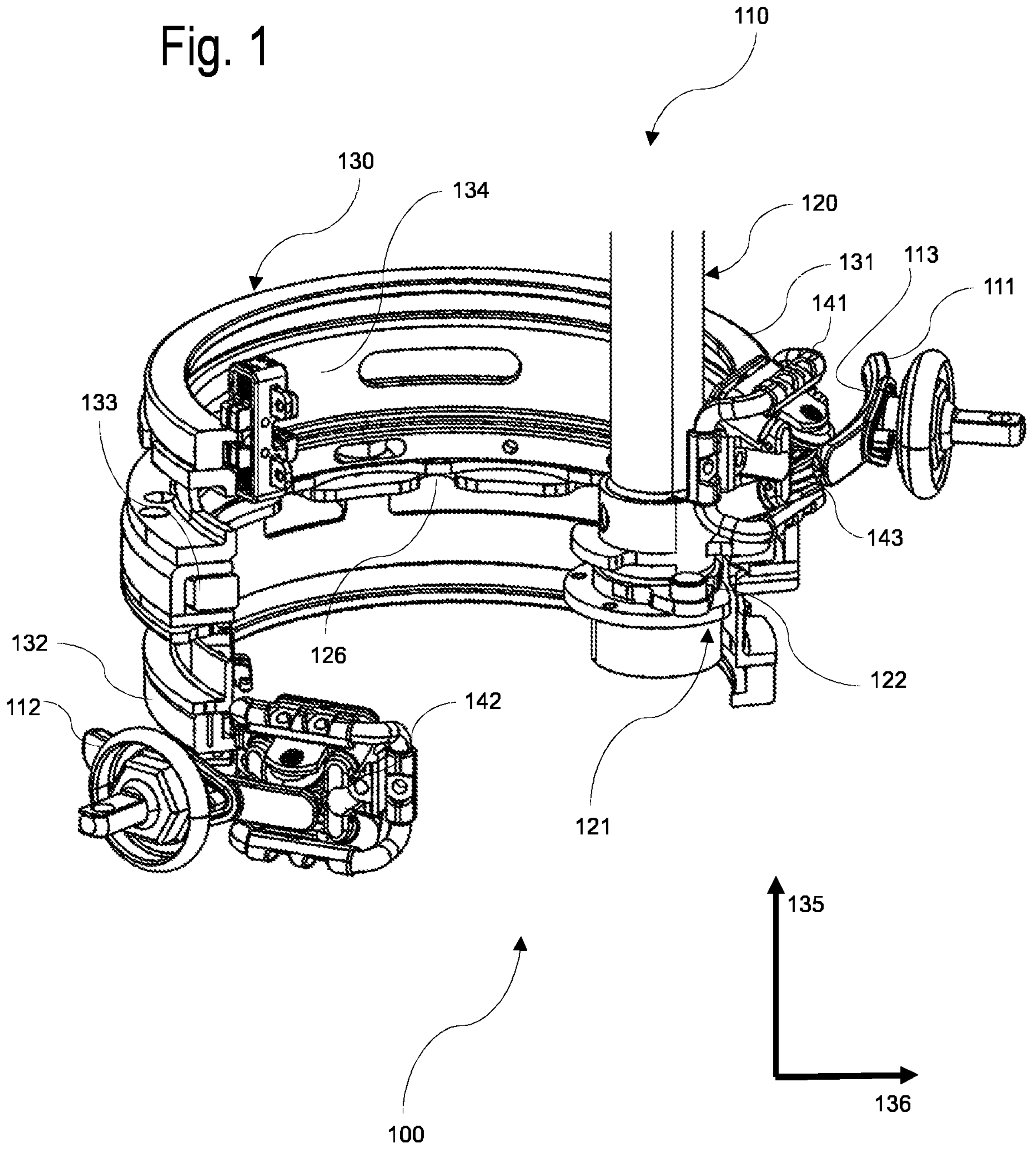
FIG. 1 is a schematic view of a tap selector for an on-load tap changer according to an embodiment.
Figure 2:
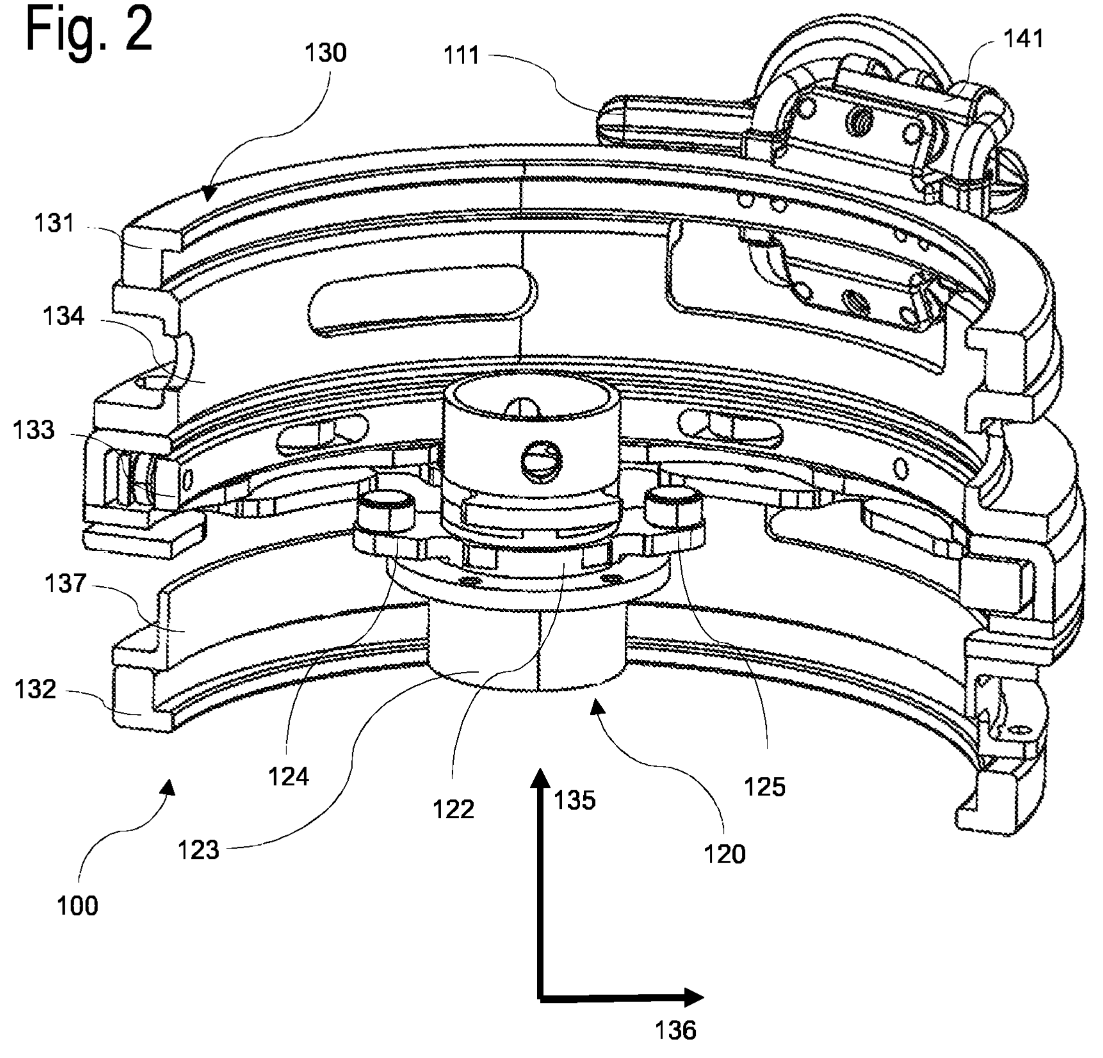
FIG. 2 is a schematic view of the on-load tap changer according to an embodiment.

FIGS. 1 and 2 show schematic views of an exemplary embodiment of a tap selector of an on-load tap changer 100 at least in parts. In particular, the on-load tap changer 100 is of the design and construction of a diverter switch tap changer.

The on-load tap changer 100 is configured for regulation of the output voltage of a power transformer to required levels. With the aid of the on-load tap changer the turn ratios of the power transformer can be altered.

A cylindrical housing (not explicitly shown) surrounds a switching system 110. Stationary contact elements 111, 112 are arranged in circular form at the housing. For example, the stationary contact elements 111, 112 are arranged in two circles that are offset from each other with respect to a stacking direction 135 which corresponds to a longitudinal axis of the housing. Two contact elements 111, 112 are explicitly shown in FIG. 1. More than two contact elements 111, 112 are arranged according to embodiments, for example four, five, six, seven, eight, nine, ten, eleven, twelve, thirteen, fourteen or more contact elements 111, 112. The number of contact elements 111, 112 in particular corresponds to the numbers of taps of the on-load tap changer 100.

The on-load tap changer 100 comprises a drive system 120. The drive system 120 is configured to change the connections to specific taps of the on-load tap changer 100. The drive system 120 comprises a drive shaft 123. The drive shaft 123 can be driven by a motor or another actuator to rotate around its longitudinal axis. The longitudinal axis of the drive shaft 123 is eccentrically arranged with respect to the ring stack 120. The longitudinal axis of the drive shaft 123 is eccentrically arranged with respect to a longitudinal axis of the ring stack 120. The longitudinal axis of the drive shaft 123 is eccentrically arranged with respect to an axis of rotation of the ring stack 120. The drive shaft 123 drives a driving wheel 122. The driven wheel 122 is part of a Geneva mechanism 121 which is configured to drive a change of the connected taps of the tap changer 100.

The Geneva mechanism 121 comprises a Geneva ring 133. The Geneva ring 133 comprises a multitude of recesses 126. The recesses 126 are open to an inner side of the Geneva ring 133. Thus, an internal Geneva mechanism 121 is realized.

The driving wheel 122 comprises two protrusions 124, 125. A rotation of the Geneva ring 133 is caused by a rotation of the drive shaft 123. The rotation of the drive shaft 123 is transmitted to a rotation of the driving wheel 122. The driving wheel 122 is connected to the drive shaft 123 and rotates together with the drive shaft 123. The protrusions 124, 125 of the driving wheel 122 protrude radially with respect to the drive shaft 123.

The protrusions 124, 125 are each configured to interact and engage with the recess 126. When one of the protrusions 124, 125 engages the recess 126, the Geneva ring 133 rotates together with the driving wheel 122. Thereby, a first current carrier ring 131 and a second current carrier ring 132 are uniformly and simultaneously rotated together with the Geneva ring 133. The protrusions 124, 125 are alternately coupleable with the Geneva ring 133 to transmit a rotation of the driving wheel 122 to the Geneva ring 133.

The first current carrier ring 131, the Geneva ring 133 and the second current carrier ring 132 are part of a ring stack 130. For example, the ring stack 130 comprises additional rings, for example one or more insulation rings 134 and/or one or more intermediate rings 137. The different rings 131, 132, 133, 134, 137 of the ring stack 130 are connected to each other such that they rotate together and a relative movement between the rings 131 to 134 and 137 is blocked. Thus, by a single Geneva mechanism 121 both current carrier rings 131, 132 are driven and rotated. A rotational movement of the Geneva ring 133 is transmitted to the first current carrier ring 131 and is also transmitted to the second current carrier ring 132 such that the first current carrier ring 131 and the second current carrier ring 132 rotate together when the Geneva ring 133 rotates.

The current carrier rings 131, 132 each comprises an electrically conductive material or is made out of an electrically conductive material and is configured to conduct electrical current.

Along the stacking direction 135, which corresponds to a longitudinal axis of the drive shaft 123 and to a rotation axis of the drive shaft 123, the Geneva ring 133 and the insulation ring 134 are arranged between the first current carrier ring 131 and the second current carrier ring 132.

The drive shaft 123 is arranged inside the ring stack 120. The drive shaft 123 is arranged inside the Geneva ring 133. The drive shaft 123 is arranged inside the insulation ring 134. The drive shaft 123 is arranged inside the first current carrier ring 131. The drive shaft 123 is arranged inside the second current carrier ring 132. The rings, in particular the Geneva ring 133 and the current carrier rings 131, 132, are arranged such that they surround the drift shaft 123.

For example, along the stacking direction 135 the ring stack 130 comprises in this order: The first current carrier ring 131 which is, for example, made of a plurality of current carrier sub-rings and for example comprises the intermediate ring 137, the Geneva ring 133, the insulation ring 134 and the second current carrier ring 132.

According to a further embodiment, a different sequence of the rings of the ring stack 130 is also possible. In particular, the insulation ring 134 is always between the two current carrier rings 131, 132 to electrically insulate the two current carrier rings 131, 132 from each other.

According to further embodiments, the Geneva ring 133 is arranged between the first current carrier ring 131 and the insulation ring 134. It is also possible that one of the current carrier rings 131, 132 is arranged between the Geneva ring 133 and the insulation ring 134. Arranging the Geneva ring 133 and the insulation ring 134 between the two current carrier rings 131, 132 allows a sufficiently large spacing between the two current carrier rings 131, 132 such that an electrical isolation is reliably realized.

A first movable contact 141 is connected to the first current carrier ring 131. The first current carrier ring 131 and the first movable contact 141 are mechanically and electrically coupled with each other such that the first movable contact 141 moves and rotates when the first current carrier ring 131 rotates. Thereby the first movable contact 141 is rotatable and movable relative to the housing of the on-load tap changer 100 and thus relative to the contact elements 111, 112.

A second movable contact 142 is correspondingly connected with the second current carrier ring 132. The second movable contact 142 is movable and rotatable relative to the contact elements 111, 112 by rotating the second current carrier ring 132.

The first movable contact 141 and the second movable contact 142 both are movable driven by the single Geneva mechanism 121. The rotation of the Geneva ring 133 is transmitted to the first movable contact 141 as well as to the second movable contact 142.

When the Geneva ring 133 rotates the movable contacts 141, 142 are moved such that a connection to the contact elements 111, 112 is changed. For example, the first current carrier ring 131 with the first movable contact 141 and corresponding contact elements 111 correspond to odd positions of the on-load tap changer 100. The second current carrier ring 132 with the second movable contact 142 and corresponding contact elements 112 correspond to even positions of the on-load tap changer 100.

By rotating the Geneva ring 133, the first movable contact 141 corresponding to the odd positions is moved and the second movable contact 142 corresponding to the even positions is moved. The position of the first movable contact 141, the second movable contact 142 as well as the contact elements 111, 112 is predetermined such that the rotation of both of the current carrier rings 131, 132 allows an alternating connection of the first movable contact 141 and the second movable contact 142 to corresponding contact elements 111, 112 to alternatingly connect odd and even positions of the on-load tap changer 100.

The ring stack 120, in particular the current carrier rings 131, 132 and the Geneva ring 133 rotate around an axis of rotation which is different from the rotation axis of the drive shaft 123. For example, the ring stack rotates around a central axis of the ring stack 120. The rotation axis of the drive shaft 123 is offset to the axis of rotation of the ring stack 120. The rotation axis of the drive shaft 123 is eccentrically arranged with respect to the axis of rotation of the ring stack 120.

The first contact element 111 comprises an end face 113 that faces the ring stack 130. The second contact element 112, like all other contact elements that are not explicitly shown, comprises a similar end face that faces the ring stack 130.

The first movable contact 141 comprises an end face 143 that faces away from the ring stack 130 and that faces the first contact element 111 in a state in which a coupling is formed. The second movable contact 142 comprises a similar end face that faces away from the ring stack 130 and that faces the second contact element 112 in a state in which a coupling is formed.

For example, the contact elements 111, 112 comprise an arc-shaped elongated form that is coaxial to the ring stack 130. In particular the end face 113 comprises an arc-shaped elongated form. The arc-shaped form of the contact elements 111, 112 allows a connection between the first movable contact 141 and the second movable contact 142 even during a rotation of the ring stack 130. The first contact element 111 and the first movable contact 141 are mechanically and/or electrically in contact with each other on the end faces 113, 143 that are facing each other along a radial direction 136 connection.

For example, the first movable contact 141 is in contact with the contact element 111 and the second movable contact 142 is not in contact with the contact element 112. By rotating the ring stack 130, the first movable contact 141 is rotated along the contact elements 111. While the contact between the first movable contact 141 and the contact element 111 is still maintained, the second movable contact 142 comes into contact with the contact element 112. A further rotation of the ring stack 130 leads to a disconnection of the first movable contact 141 and the contact element 111 while the contact between the second movable contact 142 and the contact element 112 is kept.

Figure 3:
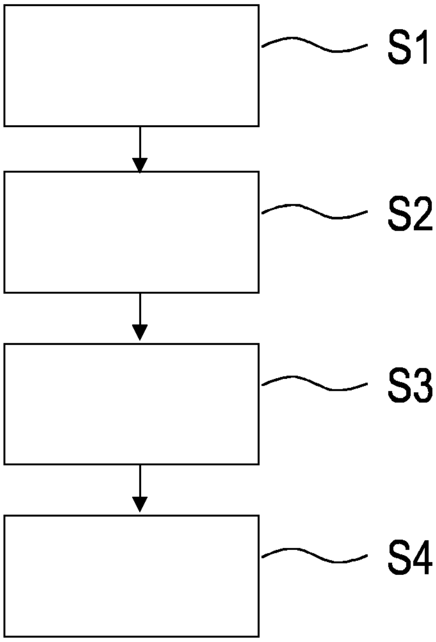
FIG. 3 is a flowchart of a method for switching a tap connection according to an embodiment.

FIG. 3 shows a flowchart of a method for switching a tap connection of the on-load tap changer 100 according to an embodiment.

In step S1, the driving wheel 122 is rotated.

In step S2, one of the protrusions 124, 125 couples to one of the recesses 126 of the Geneva ring 133.

In step S3, the Geneva ring is rotated due to the coupling of the driving wheel 122 with the Geneva ring 133.

In step S4, the rotation of the Geneva ring 133 rotates the first current carrier ring 131 and the second current carrier ring 132 jointly. The first and the second movable contacts 141, 142 are jointly rotated and a rotational movement of the first and, in particular, the second movable contacts 141, 142 relative to each other is blocked.

The rotation of the first current carrier ring 131 and the second current carrier ring 132 leads to a decoupling of one of the movable contacts 141, 142 from one of the contact elements 111, 112. The other one of the first movable contact 141 and the second movable contact 142 couples with the respective contact element 111, 112, such that an electrically conductive and mechanical connection is established.

The on-load tap changer 100 with the single Geneva mechanism 121 for driving both current carrier rings 131, 132 realizes a single stage internal Geneva driving mechanism 121 for operating the movement of the current carrier rings 131, 132 of the power diverter switch on-load tap changer. The on-load tap changer 100 realizes a compact and simple solution for driving both, the odd and even, positions of the switching system 110 by stacking the current carrier rings 131, 132 into the ring stack 130. The Geneva mechanism 121 with a single driving wheel 122 operates via the single Geneva ring 133, the first current carrier ring 131 for the odd contacts and the second current carrier ring 132 for the even contacts. The Geneva mechanism 122 delivers intermittent motion to both current carrier rings 131, 132. The on-load tap changer 100 comprises a reduced overall face size and comprises a reduced component quantity and assembly complexity. The on-load tap changer 100 realizes a robust solution and a reliable driving of the ring stack 130.

The internal Geneva ring 133 is operated via the driving wheel 122 rotated by the drive shaft 123. Connected to the internal Geneva ring 133 via the insulation ring 134 is the odd selector current carrying system with the first current carrier ring 131 and the first movable contact 141. The even selector contact system is arranged on the side of the Geneva ring 133 facing away from the first current carrier ring 131. The second current carrier ring 132 is connected to the Geneva ring 133 via the intermediate ring 137. The second movable contact 142 is connected to the second current carrier ring 132.

The on-load tap changer 100 realizes a compact selector mechanism with a large angle of positioning. Multi position selectors are realizable. The on-load tap changer 100 comprises a robust and reliable design and a simple overall driving and positioning mechanism.

The embodiments shown in the FIGS. 1 to 3 as stated represent exemplary embodiments of the on-load tap changer 100 and method for switching a tap connection; therefore, they do not constitute a complete list of all embodiments according to the on-load tap changer 100 and method according to the disclosure. Actual arrangements of the on-load tap changer 100, drive system 120, ring stack 130 and/or method may vary from the embodiments shown in the figures.

REFERENCE SIGNS

100 on-load tap changer
110 switching system
111, 112 contact element
113 end face
120 drive system
121 internal Geneva mechanism
122 driving wheel
123 drive shaft
124, 125 protrusion
126 recess
130 ring stack
131 first current carrier ring
132 second current carrier ring
133 internal Geneva ring
134 insulation ring
135 stacking direction
136 radial direction
137 intermediate ring
141 first movable contact
142 second movable contact
143 end face
S1 to S4 method steps

The invention claimed is:

1. A switching system for an on-load tap changer, comprising:

a rotatable ring stack, the rotatable ring stack being part of an internal Geneva mechanism and a drive system comprising a driving wheel, the ring stack comprising:

a first current carrier ring and a second current carrier ring each of which is selectively electrically coupleable to one of a plurality of contact elements of the tap changer, and a Geneva ring, the driving wheel being mechanically coupleable with the Geneva ring, such that the Geneva ring is rotatable by the driving wheel, and the first and the second current carrier rings each being coupled with the Geneva ring such that a rotation of the Geneva ring causes a joint rotation of the first and the second current carrier ring.

2. The switching system according to claim 1, wherein the ring stack comprises an insulation ring, wherein the Geneva ring and the insulation ring are arranged between the first and the second current carrier rings along a stacking direction of the ring stack.

3. The switching system according to claim 1, wherein the driving wheel comprises two protrusions, the protrusions being alternately coupleable with the Geneva ring to transmit a rotation of the driving wheel to the Geneva ring.

4. The switching system according to claim 1, comprising:

a drive shaft, the drive shaft being rotatable to rotate the driving wheel, wherein the drive shaft is arranged eccentrically to the Geneva ring.

5. The switching system according to claim 1, wherein the rings of the rotatable ring stack are fixed to each other such that a rotational movement of the rings relative to each other is blocked.

6. The switching system according to claim 1, comprising a first movable contact that is connected to the first current carrier ring and a second movable contact that is connected to the second current carrier ring, such that the first and the second movable contacts are alternately coupleable to a respective one of the contact elements.

7. The switching system according to claim 6, wherein the first and the second movable contacts are jointly rotatable and a rotational movement of the first and the second movable contacts relative to each other is blocked.

8. The switching system according to one claim 6, wherein an electrically conductive coupling between the first and the second movable contacts and the one of the contact elements respectively is established along a radial direction.

9. The switching system according to claim 1, wherein the contact elements each comprise an elongated arc shaped form partially surrounding the first or the second current carrier rings.

10. An on-load tap changer, comprising:

a switching system according to claim 1, and the contact elements, wherein the ring stack of the switching system is rotatable relative to the contact elements.

11. A method for switching a tap connection of the on-load tap changer according to claim 10, comprising:

rotating the driving wheel, and coupling the driving wheel to the Geneva ring of the ring stack, and thereby rotating the Geneva ring, and thereby rotating the first current carrier ring and the second current carrier ring of the ring stack jointly.

12. The on-load tap changer according to claim 10, wherein the ring stack comprises an insulation ring, wherein the Geneva ring and the insulation ring are arranged between the first current carrier ring and the second current carrier ring along a stacking direction of the ring stack.

13. The on-load tap changer according to claim 10, wherein the driving wheel comprises two protrusions, the protrusions being alternately coupleable with the Geneva ring to transmit a rotation of the driving wheel to the Geneva ring.

14. The on-load tap changer according to claim 10, comprising:

a drive shaft, the drive shaft being rotatable to rotate the driving wheel, wherein the drive shaft is arranged eccentrically to the Geneva ring.

15. The on-load tap changer according to claim 10, wherein the rings of the rotatable ring stack are fixed to each other such that a rotational movement of the rings relative to each other is blocked.

16. The on-load tap changer according to claim 10, further comprising a first movable contact that is connected to the first current carrier ring and a second movable contact that is connected to the second current carrier ring, such that the first movable contact and the second movable contact are alternately coupleable to a respective one of the contact elements.

17. The on-load tap changer according to claim 16, wherein the first movable contact and the second movable contact are jointly rotatable and a rotational movement of the first movable contact and the second movable contact relative to each other is blocked.

18. The on-load tap changer according to claim 16, wherein an electrically conductive coupling between the first movable contact and the second movable contact and the one of the contact elements respectively is established along a radial direction.

19. The on-load tap changer according to claim 10, wherein the contact elements each comprise an elongated arc shaped form partially surrounding the first current carrier ring or the second current carrier ring.

* * * * *